(12) United States Patent
Senoo et al.

(10) Patent No.: US 9,744,844 B2
(45) Date of Patent: Aug. 29, 2017

(54) MOTOR DRIVE UNIT

(71) Applicant: NISSAN MOTOR CO., LTD., Yokohama-shi, Kanagawa (JP)

(72) Inventors: Takashi Senoo, Machida (JP); Katsunori Asogawa, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 14/423,304

(22) PCT Filed: Jul. 17, 2013

(86) PCT No.: PCT/JP2013/069355
§ 371 (c)(1),
(2) Date: Feb. 23, 2015

(87) PCT Pub. No.: WO2014/038290
PCT Pub. Date: Mar. 13, 2014

(65) Prior Publication Data
US 2015/0183312 A1  Jul. 2, 2015

(30) Foreign Application Priority Data

Sep. 10, 2012  (JP) ................................. 2012-198131

(51) Int. Cl.
*B60K 7/00* (2006.01)
*F16D 3/18* (2006.01)
(Continued)

(52) U.S. Cl.
CPC .......... *B60K 7/0007* (2013.01); *B60B 35/121* (2013.01); *B60K 17/046* (2013.01);
(Continued)

(58) Field of Classification Search
CPC .. B60K 7/00; B60K 7/007; B60K 2007/0046; B60K 2007/0053; B60K 2007/0061;
(Continued)

(56) References Cited

U.S. PATENT DOCUMENTS 3,772,549 A * 11/1973 Cumming ............... B60T 8/329
 188/181 R
3,828,150 A * 8/1974 Hubbard ................... G01P 3/22
 188/181 R (Continued)

FOREIGN PATENT DOCUMENTS

CN 102648362 A 8/2012
JP 2009190440 A 8/2009
WO 2011070882 A1 6/2011

*Primary Examiner* — Frank Vanaman
(74) *Attorney, Agent, or Firm* — Young Basile Hanlon & MacFarlane, P.C.

(57) ABSTRACT

A motor drive unit, in which an output end of a motor drive system using an electric motor as a power source and a rotator rotatably supported by a bearing unit are arranged side by side in an axial direction, and the output end of the motor drive system and the rotator are drivingly coupled in a relatively displaceable manner by a coupling member in which a plurality of couplers spaced apart in an axial direction are set. The bearing unit of the rotator is arranged such that a center of displacement of the rotator defined by the bearing unit is located between an arbitrary pair of couplers among the couplers.

5 Claims, 4 Drawing Sheets

(51) Int. Cl.
*F16D 3/84* (2006.01)
*B60K 17/04* (2006.01)
*B60B 35/12* (2006.01)
B60B 27/00 (2006.01)
F16H 1/28 (2006.01)

(52) U.S. Cl.
CPC ............ *F16D 3/185* (2013.01); *F16D 3/84* (2013.01); *B60B 27/0026* (2013.01); *B60B 2900/111* (2013.01); *B60B 2900/112* (2013.01); *B60B 2900/114* (2013.01); *B60K 2007/0038* (2013.01); *B60K 2007/0053* (2013.01); *B60K 2007/0092* (2013.01); *F16D 2300/06* (2013.01); *F16D 2300/08* (2013.01); *F16D 2300/18* (2013.01); *F16H 2001/2881* (2013.01)

(58) Field of Classification Search
CPC ......... B60K 2007/0076; B60L 2220/44; B60L 2220/46; B60L 2220/50
See application file for complete search history.

(56) References Cited

U.S. PATENT DOCUMENTS

| | | |
|---|---|---|
| 8,807,253 B2 | 8/2014 | Suzuki |
| 2004/0094928 A1* | 5/2004 | Amanuma ............... B60G 3/20 280/124.125 |
| 2005/0145445 A1* | 7/2005 | Shimizu ............... B60K 7/0007 188/18 A |
| 2012/0241233 A1 | 9/2012 | Suzuki |
| 2013/0057117 A1* | 3/2013 | Suzuki ................ B60K 7/0007 310/60 R |

* cited by examiner

MOTOR DRIVE UNIT

CROSS REFERENCE TO RELATED APPLICATION

The present application claims priority to Japanese Patent Application No. 2012-198131, filed Sep. 10, 2012, incorporated herein in its entirety.

TECHNICAL FIELD

The present invention relates to a motor drive unit useful for a drive unit (commonly known as an in-wheel motor unit) for each wheel for use in an electric vehicle capable of traveling with individual electric motors driving drive wheels, respectively, and more particularly to an improvement in a coupling structure to drivingly couple, in a relatively displaceable manner, an output end of a motor drive system using the electric motor as a power source and a rotator rotatably supported on a bearing unit.

BACKGROUND

A unit as disclosed for example in Japanese Patent Application Publication No. 2009-190440, configured as an in-wheel motor unit, has heretofore been proposed as such a motor drive unit. The in-wheel motor unit uses an annular coupling member to couple an output end of a motor drive system and a wheel hub (or a rotator) rotatably supported with a hub bearing (or a bearing unit).

In an electric vehicle including such an in-wheel motor unit for each drive wheel, when an electric motor is driven, rotation of the electric motor is transmitted from the output end of the motor drive system via the annular coupling member to the wheel hub (or the drive wheel) thereby to allow the vehicle to travel.

Incidentally, wearing of the hub bearing (or the bearing unit) in itself supporting rotatably the wheel hub (or the drive wheel) as the rotator, deflection of the wheel hub (or the drive wheel), or the like may cause the wheel hub (or the drive wheel) to be displaced relative to the output end of the motor drive system.

Such a displacement of the wheel hub (or the drive wheel), if affecting the output end of the motor drive system, causes a change in an air gap between a stator and a rotor of the electric motor and hence imposes performance deterioration or torque variations in the electric motor, or, if a reduction gear mechanism is interposed in the output end of the motor drive system, causes contact of teeth of the reduction gear mechanism and hence imposes gear noise or a reduction in gear longevity and further an increase in power loss due to a change in a backlash between gears.

Therefore, Japanese Patent Application Publication No. 2009-190440 takes a measure so as to prevent the displacement of the wheel hub (or the drive wheel) from affecting the output end of the motor drive system. The measure is such that an annular coupling member is additionally provided in an abutting portion of the output end of the motor drive system and a shaft of the wheel hub (or the drive wheel), the annular coupling member and the output end of the motor drive system are drivingly coupled together in a relatively displaceable manner and a motor-side coupler is set between the annular coupling member and the output end of the motor drive system, and the opposite end of the annular coupling member and the shaft of the wheel hub (or the drive wheel) are drivingly coupled together in a relatively displaceable manner and a wheel-side coupler is set between the opposite end of the annular coupling member and the shaft of the wheel hub (or the drive wheel).

The motor-side coupler and the wheel-side coupler are set for the purpose of serving their respective coupler functions to accommodate the displacement of the wheel hub (or the drive wheel) and thereby prevent the displacement of the wheel hub (or the drive wheel) from reaching the output end of the motor drive system.

However, in the above-described conventional motor drive unit, the motor-side coupler and the wheel-side coupler are set on ends of the annular coupling member and are arranged adjacent to each other in the axial direction, and a center of displacement of the wheel hub (or the drive wheel) defined by the hub bearing (or the bearing unit) supporting rotatably the wheel hub (or the drive wheel), therefore, the hub bearing (or the bearing unit), is located farther from the output end of the motor drive system than the annular coupling members, or than the motor-side coupler and the wheel-side coupler.

Thus, the motor-side coupler, the wheel-side coupler, and the center of displacement of the wheel hub (or the drive wheel) are sequentially arranged in this order in the axial direction, and the following problem arises.

The wearing of the hub bearing (or the bearing unit) in itself or the deflection of the wheel hub (or the drive wheel) may cause swinging displacement of the wheel hub (or the drive wheel) about the center of displacement defined by the hub bearing (or the bearing unit).

Therefore, in the conventional motor drive unit in which the motor-side coupler, the wheel-side coupler, and the center of displacement of the wheel hub (or the drive wheel) are sequentially arranged in this order in an axial direction, only an extremely slight amount of swinging displacement about the center of displacement of the wheel hub (or the drive wheel), within a tiltable range of the annular coupling member, can be accommodated, and most of the swinging displacement about the center of displacement of the wheel hub (or the drive wheel) cannot be accommodated.

Thus, the following problem arises. Specifically, transmission of the swinging displacement about the center of displacement of the wheel hub (or the drive wheel), from the output end of the motor drive system to the reduction gear mechanism and via the reduction gear mechanism to the electric motor cannot be avoided. Thus, the gear noise or the reduction in the gear longevity due to the contact of the teeth of the reduction gear mechanism and the increase in the power loss due to the change in the backlash between the gears cannot be prevented as intended, and the performance deterioration or the torque variations in the electric motor due to the change in the air gap in the electric motor cannot be prevented as intended.

SUMMARY

An object of the present invention is to propose a motor drive unit improved so as to solve the foregoing problem, by embodying the following concept, from the viewpoint that the foregoing problem is caused by the axial arrangement of the centers of displacement of the motor-side coupler, the wheel-side (or rotator-side) coupler and the wheel hub (or rotator) and, when the center of displacement of the rotator is located between the motor-side coupler and the rotator-side coupler in an axial direction, swinging displacement of the rotator about the center of displacement can be accommodated with reliability by the coupler action of the motor-side coupler and the rotator-side coupler.

For this purpose, a motor drive unit of the present invention is configured as given below.

Firstly, description will be given with regard to a motor drive unit on which the present invention is based. The motor drive unit is a motor drive unit in which an output end of a motor drive system using an electric motor as a power source and a rotator rotatably supported by a bearing unit are arranged side by side in an axial direction, and the output end of the motor drive system and the rotator are coupled in a relatively displaceable manner by a coupling member in which plural couplers spaced apart in the axial direction are set.

The motor drive unit of the present invention is characterized in that the bearing unit of the rotator is arranged such that a center of displacement of the rotator defined by the bearing unit is located between an arbitrary pair of couplers among the couplers.

According to the motor drive unit of the present invention, the center of displacement of the rotator defined by the bearing unit is located between the pair of couplers. Thus, when the rotator undergoes swinging displacement about the center of displacement, the swinging displacement can be accommodated with reliability by the coupler action of the couplers on both sides of the center of displacement.

Therefore, the swinging displacement of the rotator about the center of displacement can be prevented from being transmitted from the output end of the motor drive system via the motor drive system to the electric motor, and an adverse influence on the motor drive system, of course, can be avoided, and performance deterioration or torque variations of the electric motor due to a change in an air gap can be avoided with reliability.

DESCRIPTION OF EMBODIMENTS

An embodiment of the present invention will be described below with reference to the accompanying drawings.

Figure 1:
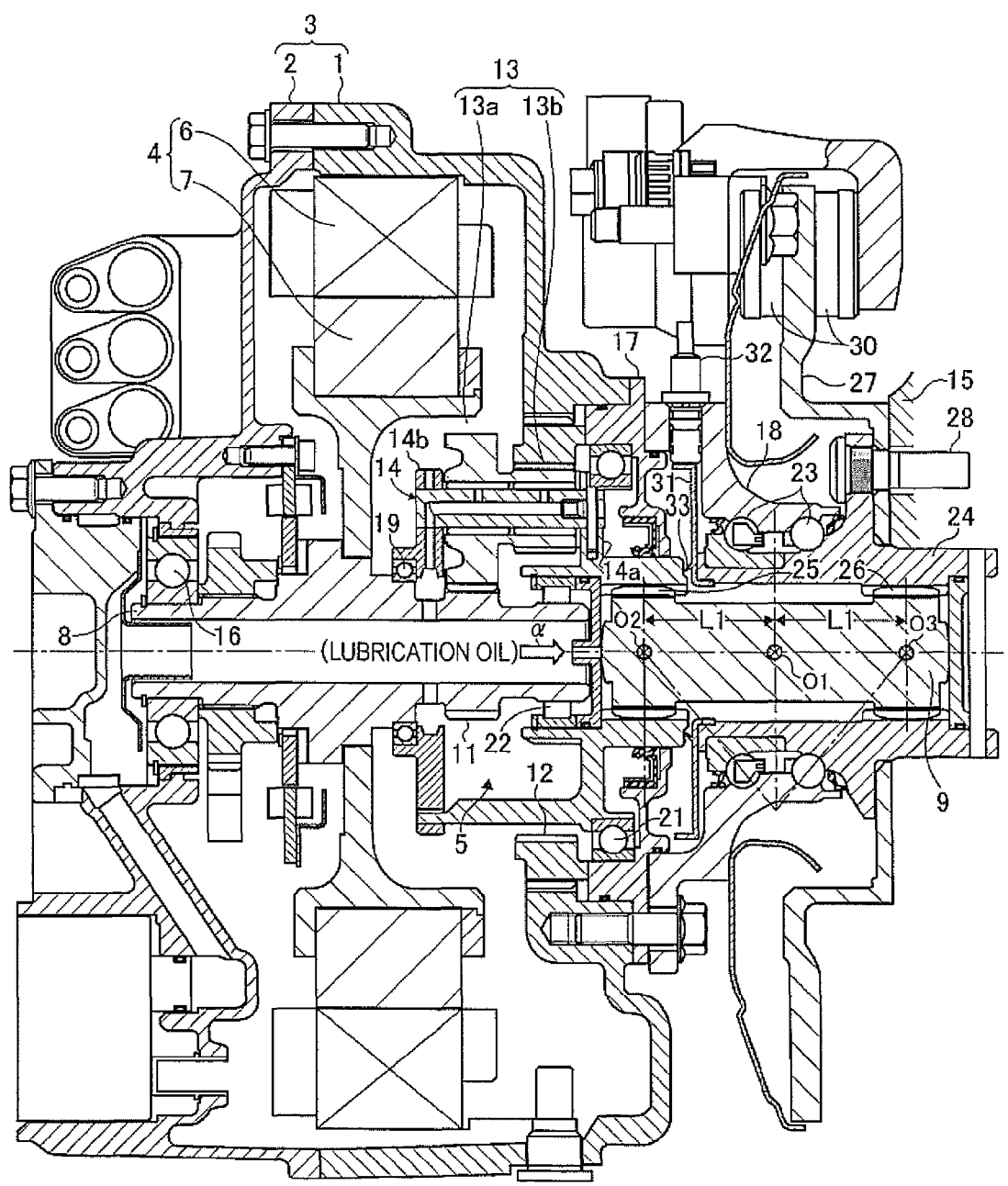
FIG. 1 is a longitudinal side view illustrating a motor drive unit according to one embodiment of the present invention in which the motor drive unit is configured as an in-wheel motor unit.

FIG. 1 is a longitudinal side view illustrating a motor drive unit according to one embodiment of the present invention. In the embodiment, the motor drive unit is configured as an in-wheel motor unit. In FIG. 1, reference numeral 1 denotes a case body of the in-wheel motor unit; and 2, a rear cover of the case body 1. The case body 1 and the rear cover 2 form a unit case 3 of the in-wheel motor unit.

The in-wheel motor unit illustrated in FIG. 1 is formed of an electric motor 4 and an epicycle reduction gear set 5 (hereinafter called merely a "reduction gear set"), which are housed in the unit case 3. The electric motor 4 is formed of an annular stator 6 fitted and fixedly provided in an inner periphery of the case body 1, and a rotor 7 concentrically arranged on an inner periphery of the annular stator 6 with a radial gap in between.

The reduction gear set 5 serves to drivingly couple an input shaft 8 and an output shaft 9 arranged facing each other in coaxially abutting relation. The reduction gear set 5 is formed of a sun gear 11, a fixed ring gear 12 concentrically arranged and offset toward the output shaft 9 with respect to the sun gear 11 in an axial direction, a stepped planetary pinion 13 (or a stepped pinion) having a meshing engagement with the sun gear 11 and the ring gear 12, and a carrier 14 (14a, 14b) rotatably supporting the stepped planetary pinion 13.

The input shaft 8 is integrally formed and provided with the sun gear 11 on an inner end close to the output shaft 9, and the input shaft 8 extends rearward from the sun gear 11 toward the rear cover 2. The output shaft 9 extends in the opposite direction (or outward) from the reduction gear set 5 and protrudes through an opening in the case body 1 at its front end (or on the right-hand side of FIG. 1), and, in this protruding portion, a wheel disc 15 of a wheel is coupled to the output shaft 9, as described later.

An end portion of the input shaft 8 far away from the output shaft 9 is rotatably supported on the rear cover 2 by a bearing 16 which may be a ball bearing, and an end portion of the input shaft 8 close to the output shaft 9 is rotatably supported on the case body 1, as described later.

The electric motor 4 has the rotor 7 coupled to the input shaft 8, and this coupled position is set to an axial position between the reduction gear set 5 and the bearing 16.

The ring gear 12 is secured around in the opening on the front end of the case body 1 and is retained and fixedly provided, and this retaining of the ring gear 12 is accomplished by a seal adapter 17 closing the opening on the front end of the case body 1. The seal adapter 17 is fastened and attached on the front end of the case body 1, so as to close the opening on the front end of the case body 1 together with an end lid 18.

The stepped planetary pinion 13 is configured as a stepped pinion including a large diameter gear portion 13a having a meshing engagement with the sun gear 11 on the input shaft 8, and a small diameter gear portion 13b having a meshing engagement with the ring gear 12, which are integrally formed. The small diameter gear portion 13b effects rolling movement of the stepped planetary pinion 13 along an inner periphery of the ring gear 12.

The stepped planetary pinion 13 is arranged in an orientation such that the large diameter gear portion 13a is located on the side far away from the output shaft 9, and the small diameter gear portion 13b is located on the side close to the output shaft 9.

A set of the stepped planetary pinions 13, for example four in number, is arranged circumferentially at equal intervals, and the stepped planetary pinions 13 are rotatably supported by the carrier 14, while keeping being arranged circumferentially at equal intervals.

The carrier 14 is formed of a pair of carriers 14a, 14b coaxially facing each other, and the carriers 14a, 14b function as output rotation members of the reduction gear set 5.

Therefore, the carrier 14 (14a, 14b) forms an output end of a motor drive system using the electric motor 4 as a power source.

The carrier 14b far away from the output shaft 9 is rotatably supported on the input shaft 8 by a bearing 19 on an inner periphery of the carrier 14b, which may be a ball bearing, and the carrier 14a close to the output shaft 9 is rotatably supported on the seal adapter 17, therefore, the case body 1, by a bearing 21 on an outer periphery of the carrier 14a, which may be a ball bearing.

An end portion of the input shaft 8 adjacent to the output shaft 9 is inserted in an inner periphery of the carrier 14a rotatably supported on the case body 1 through the seal adapter 17, and the end portion of the input shaft 8 is rotatably supported on the inner periphery of the carrier 14a by a roller bearing 22.

A wheel hub 24 is rotatably supported in a center hole of the end lid 18 by a double row angular bearing 23, and the output shaft 9 is inserted into a hollow hole of the wheel hub 24. An end portion of the output shaft 9 abutting the input shaft 8 is drivingly coupled by a motor-side coupler 25 to the inner periphery of the carrier 14a in axial displaceable and swinging displaceable manner, and the other end portion of the output shaft 9 is drivingly coupled by a wheel hub-side (or rotator-side) coupler 26 to an inner periphery of the wheel hub 24 in axial displaceable and swinging displaceable manner.

Therefore, the output shaft 9 corresponds to a coupling member to provide coupling between the carrier 14a (or the output end of the motor drive system) and the wheel hub 24. The wheel hub 24 forms the rotator of the present invention. The double row angular bearing 23 forms the bearing unit of the wheel hub 24 (or the rotator), in conjunction with the end lid 18.

A brake disc 27 is coupled integrally and concentrically with the wheel hub 24, and plural wheel bolts 28 are provided to pass through the wheel hub 24 and the brake disc 27 and to protrude therefrom in the axial direction.

Mounting of the wheel disc 15 (or the wheel) to the wheel hub 24 is accomplished by bringing the wheel disc 15 into close contact with a side surface of the brake disc 27 in such a manner that the wheel bolts 28 pass through bolt holes formed in the wheel disc 15, and, in this state, tightly fastening and screwing wheel nuts 29 to the wheel bolts 28.

Here, the wheel hub-side (or rotator-side) coupler 26 which controls driving coupling between the output shaft 9 and the wheel hub 24 is set at the position of an end portion of the wheel hub 24 far away from the input shaft 8, so that the wheel hub-side (or rotator-side) coupler 26 is located at a position farther away from the input shaft 8 than the double row angular bearing 23 in the axial direction.

Specifically, the relative positions of the wheel hub-side (or rotator-side) coupler 26 and the double row angular bearing 23 are determined so that a center of swinging displacement O1 provided by the double row angular bearing 23 for the wheel hub 24 is located between a center of swinging displacement O2 provided by the motor-side coupler 25 for the carrier 14a and the output shaft 9 and a center of swinging displacement O3 provided by the wheel hub-side (or rotator-side) coupler 26 for the output shaft 9 and the wheel hub 24.

Preferably, as illustrated in FIG. 1, a configuration is such that a distance L1 between the center of swinging displacement O1 and the center of swinging displacement O2 is the same as a distance L1 between the center of swinging displacement O1 and the center of swinging displacement O3.

The motor drive unit requires a rotation sensor to detect a rotation speed of the wheel hub 24 (or the wheel), for purposes of anti-skid control or the like.

In the embodiment, the rotation sensor is formed of a sensor rotor 31 which rotates together with the wheel hub 24 (or the wheel), and a pickup 32 provided in the end lid 18. As clearly illustrated in enlarged dimensions in FIG. 2, the sensor rotor 31 is provided on an end surface of the wheel hub 24 facing an axial end surface of the carrier 14a.

Lubrication of the motor-side coupler 25 and the wheel hub-side (or rotator-side) coupler 26 is accomplished by lubrication oil illustrated by the arrow a supplied through a hollow hole of the input shaft 8, since the couplers 25, 26 are located in a central portion of the motor drive unit.

Figure 2:
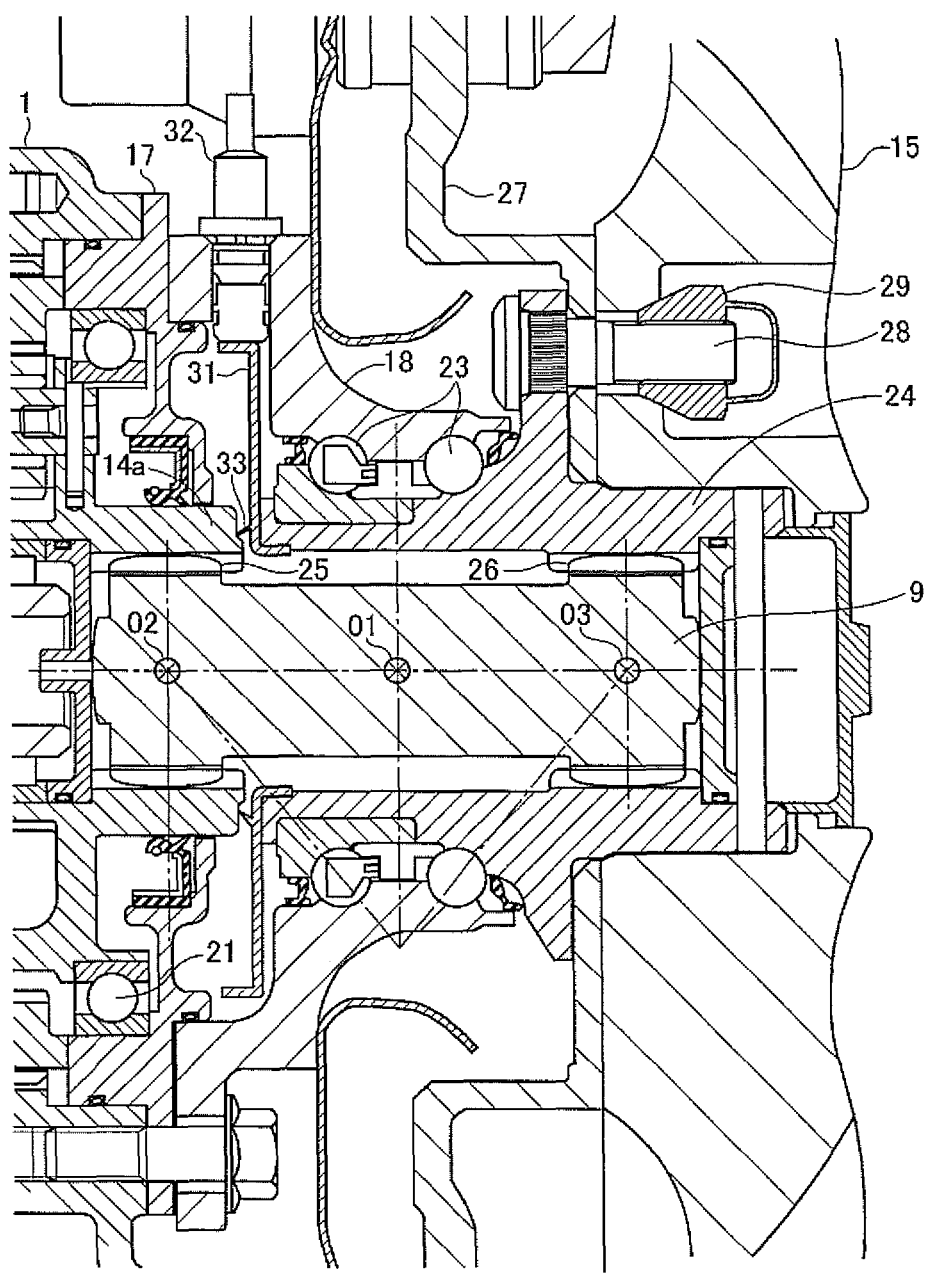
FIG. 2 is a partially enlarged longitudinal side view illustrating in enlarged view a principal part of the in-wheel motor unit illustrated in FIG. 1.

As likewise clearly illustrated in FIG. 2, a seal member 33 which seals between the carrier 14a and the axial facing end surface of the wheel hub 24 in order to seal the lubrication oil in a lubrication oil sealed-in space for the motor-side coupler 25 and the wheel hub-side (or rotator-side) coupler 26 is integrally molded on the sensor rotor 31 and is provided on a corresponding end surface of the wheel hub 24.

When an electric current is supplied to the stator 6 of the electric motor 4, the rotor 7 of the electric motor 4 is rotatably driven by an electromagnetic force from the stator 6.

A rotation drive force of the rotor 7 is transmitted via the input shaft 8 to the sun gear 11 of the reduction gear set 5. Thereby, the sun gear 11 rotates the stepped planetary pinion 13 via the large diameter gear 13a, and, at this time, the fixed ring gear 12 functions as a reaction receiver, and thus, the stepped planetary pinion 13 performs a planetary motion such that the small diameter gear 13b rolls along the ring gear 12.

The planetary motion of the stepped planetary pinion 13 is transmitted via the carrier 14 (14a, 14b) to the output shaft 9 to rotate the output shaft 9 at a reduced speed in the same direction as the input shaft 8.

By the above-described transmission action, the reduction gear set 5 decelerates rotation from the electric motor 4 to the input shaft 8 at a ratio determined by the number of teeth of the dung gear 11 and the number of teeth of the ring gear 12, and transmits the rotation via the motor-side coupler 25 to the output shaft 9.

The rotation to the output shaft 9 reaches the wheel hub 24 via the wheel hub-side (or rotator-side) coupler 26 and then is transmitted via the wheel bolts 28 to the wheel disc 15 (or the wheel) thereby enable the vehicle to travel.

For braking of the vehicle, an intended purpose can be accomplished by frictionally braking the wheel disc 15 (or the wheel) by sandwiching and pressing the brake disc 27 axially on both sides by a brake pad 30.

According to the motor drive unit of the above-described embodiment, the center of swinging displacement O1 provided by the double row angular bearing 23 for the wheel hub 24 is configured to be located between the center of swinging relative displacement O2 provided by the motor-side coupler 25 for the carrier 14a and the output shaft 9 and the center of swinging relative displacement O3 provided by the wheel hub-side (or rotator-side) coupler 26 for the output shaft 9 and the wheel hub 24. Thus, the following advantageous effects described with reference to FIG. 3 can be achieved.

Figure 3:
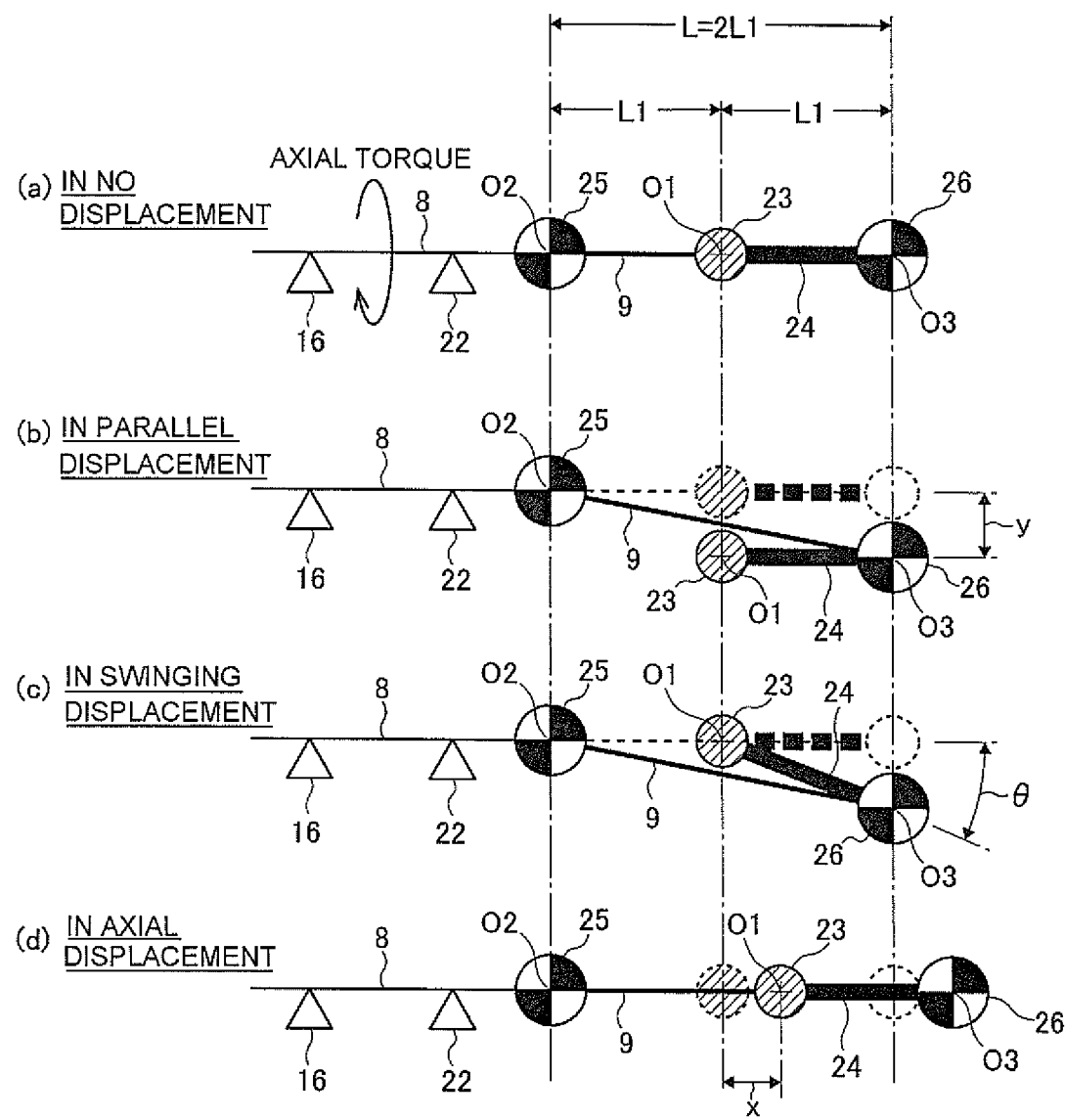
FIG. 3 illustrates in schematic form the relative positions of an input shaft, an output shaft and a wheel hub of the in-wheel motor unit illustrated in FIG. 1, and Part (a) of FIG. 3 is a schematic illustration in a case where the wheel hub undergoes no displacement, Part (b) of FIG. 3 is a schematic illustration in a case where the wheel hub undergoes parallel displacement by "y" in an axial orthogonal direction, Part (c) of FIG. 3 is a schematic illustration in a case where the wheel hub undergoes swinging displacement by "θ" about a center of displacement O1, and Part (d) of FIG. 3 is a schematic illustration in a case where the wheel hub undergoes axial displacement by "x" in an axial direction.

FIG. 3 illustrates in schematic form the relative positions of the input shaft 8, the output shaft 9 and the wheel hub 24 in connection with the centers of displacement O1, O2, O3, and Part (a) of FIG. 3 is a schematic illustration in a case where the wheel hub 24 undergoes no displacement, Part (b) of FIG. 3 is a schematic illustration in a case where the wheel hub 24 undergoes parallel displacement by y in an axial orthogonal direction, Part (c) of FIG. 3 is a schematic illustration in a case where the wheel hub 24 undergoes swinging displacement by θ about the center of displacement O1, and Part (d) of FIG. 3 is a schematic illustration in a case where the wheel hub 24 undergoes axial displacement by x in the axial direction.

When the wheel hub 24 undergoes parallel displacement as illustrated in Part (b) of FIG. 3, from a non-displaced position illustrated in Part (a) of FIG. 3, the parallel displacement can be accommodated through the illustrated inclination of the output shaft 9 by the coupler action of the couplers 25, 26. Therefore, the parallel displacement of the wheel hub 24 does not affect and displace the input shaft 8 (or the carrier 14a).

Also, when the wheel hub 24 undergoes swinging displacement by θ about the center of displacement O1 as illustrated in Part (c) of FIG. 3, from the non-displaced position illustrated in Part (a) of FIG. 3, the swinging displacement can be accommodated through the illustrated inclination of the output shaft 9 by the coupler action of the couplers 25, 26. Therefore, the swinging displacement of the wheel hub 24 does not affect and displace the input shaft 8 (or the carrier 14a).

Further, when the wheel hub 24 undergoes axial displacement as illustrated in Part (d) of FIG. 3, from the non-displaced position illustrated in Part (a) of FIG. 3, the axial displacement can be accommodated by the slide action of the couplers 25, 26. Therefore, the axial displacement of the wheel hub 24 does not affect and displace the input shaft 8 (or the carrier 14a).

In the embodiment, the center of displacement O1 is configured to be located between the centers of displacement O2, O3. Thereby, even if the wheel hub 24 undergoes any of the parallel displacement, the swinging displacement and the axial displacement as described above, the displacements can be accommodated with reliability by the couplers 25, 26, and the displacement of the wheel hub 24 does not affect and displace the input shaft 8 (or the carrier 14a) in the corresponding direction.

Therefore, the displacement of the wheel hub 24 can be prevented from being transmitted from the carrier 14a as the output end of the motor drive system to the reduction gear set 5 and the electric motor 4. Thus, gear noise or a reduction in gear longevity due to the contact of the teeth of the reduction gear set 5 and an increase in power loss due to a change in backlash between the gears can, of course, be avoided with reliability, and performance deterioration or torque variations in the electric motor 4 due to a change in an air gap in the electric motor 4 can be avoided with reliability.

Moreover, in the embodiment, the relative positions of the wheel hub-side (or rotator-side) coupler 26 and the double row angular bearing 23 are determined so that the distance L1 between the center of swinging displacement O1 and the center of swinging displacement O2 is the same as the distance L1 between the center of swinging displacement O1 and the center of swinging displacement O3, or equivalently, so that the center of swinging displacement O1 is located at a point at which a distance L between the centers of displacement O2, O3 is divided into two halves. Thus, advantageous effects as described below can be achieved.

When the center of swinging displacement O1 is not located at the point at which the distance L between the centers of displacement O2, O3 is divided into two halves, the coupler 25 or 26 associated with the center of displacement O2 or O3 closer to the center of swinging displacement O1 is increased in its angle of inclination when the wheel hub 24 undergoes the parallel displacement illustrated in Part (b) of FIG. 3 and undergoes the swinging displacement illustrated in Part (c) of FIG. 3.

Figure 4:
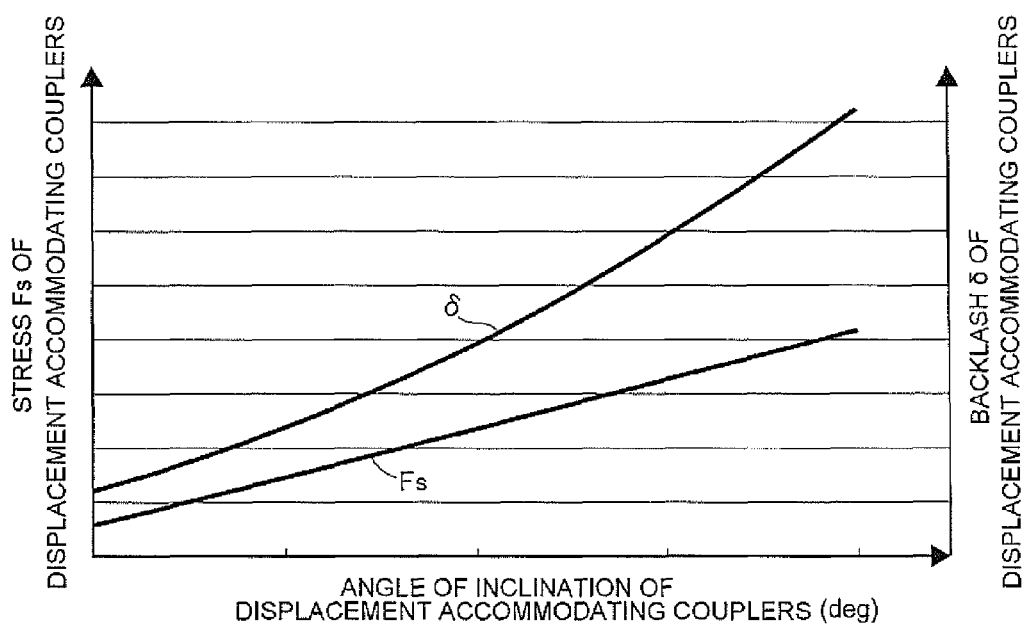
FIG. 4 is a characteristic graph illustrating change characteristics of stress "Fs" and backlash "δ" with respect to an angle of inclination of the couplers in the in-wheel motor unit illustrated in FIG. 1.

Incidentally, change characteristics of stress Fs and backlash δ with respect to the angle of inclination of the couplers 25, 26 are as illustrated in FIG. 4. As the angle of inclination of the couplers 25, 26 becomes greater, the stress Fs and the backlash δ of the couplers 25, 26 become greater.

If the stress Fs and the backlash δ of the couplers 25, 26 become greater, the couplers 25, 26 needs to become larger in size so as to allow the stress Fs and the backlash δ and requires a larger space for installment, and thus, increases in size, weight and cost of the motor drive unit cannot be avoided.

However, in the embodiment, the center of swinging displacement O1 is configured to be located at the point at which the distance L between the centers of displacement O2, O3 is divided into two halves, and thereby, the coupler 25 or 26 is not increased in its angle of inclination when the wheel hub 24 undergoes the parallel displacement illustrated in Part (b) of FIG. 3 and undergoes the swinging displacement illustrated in Part (c) of FIG. 3. Therefore, the coupler 25 or 26 is not increased in its angle of inclination, and both the stress Fs and the backlash δ of the couplers 25, 26 are small. Thus, the couplers 25, 26 can be reduced in size, and the space for installment can be small, so that size, weight and cost reductions of the motor drive unit can be achieved.

Further, in the above-described conventional motor drive unit described in Patent Literature 1, the motor-side coupler (which corresponds to the coupler 25 which provides the center of displacement O2 in the embodiment), the wheel-side coupler (which corresponds to the coupler 26 which provides the center of displacement O3 in the embodiment), and the center of displacement of the wheel hub (or the drive wheel) (which corresponds to the center of displacement O1 in the embodiment) are sequentially arranged in this order in the axial direction, and thus, an axial length of the motor drive unit is increased; however, in the embodiment, the following configuration enables avoiding a problem involving the increase in the length.

Specifically, in the embodiment, the output shaft 9 which controls driving coupling between the carrier 14a as the output end of the motor drive system and the wheel hub 24 as the rotator is inserted into and through the center hole in the wheel hub 24, and the inserted end of the output shaft 9 is drivingly coupled to the wheel hub 24 in a relatively displaceable manner by the coupler 26 at an axial position farther away from the carrier 14a (or the output end of the motor drive system) than the double row angular bearing 23 (or the bearing unit of the wheel hub 24). Thus, the coupler 26 is housed within an existing axial space, and the axial length of the motor drive unit is not increased, so that the problem involving the increase in the length can be avoided.

Also, in the embodiment, the coupler 26 is arranged at a position close to an outer side of the motor drive unit in a vehicle width direction, and thus, the positioning of the coupler 26 during assembly is easy, so that ease of assembly operation is enhanced. Further, when the motor drive unit is in a disassembled position, a structure in which a central portion of the unit is tightly sealed is easily achieved, and the reliability of part replacement maintenance operation such as replacement of the double row angular bearing 23 is easily achieved, and a reduction in repair cost is facilitated.

Also, in the embodiment, the motor-side coupler 25 drivingly couples the carrier 14a as the output rotation member of the reduction gear set 5 and the output shaft 9 in a relatively displaceable manner. Thus, the carrier 14a is also utilized as part of the motor-side coupler 25, and simplification and size, weight and cost reductions of the configuration can be achieved.

Also, the wheel hub-side (or rotator-side) coupler 26 drivingly couples the wheel hub 24 as the rotator and the output shaft 9 in a relatively displaceable manner. Thus, the wheel hub 24 is also utilized as part of the wheel hub-side (or rotator-side) coupler 26, and simplification and size, weight and cost reductions of the configuration can be achieved.

Further, in the embodiment, the sensor rotor 31 of the rotation sensor to detect the rotation speed of the wheel hub 24 (or the wheel) for purposes of the anti-skid control or the like is provided on the end surface of the wheel hub 24 facing the axial end surface of the carrier 14a. Thus, the rotation sensor formed by the sensor rotor 31 and the pickup 32 directly detects the rotation speed of the wheel hub 24 (or the wheel) located on a distal end of a wheel drive system. Thus, a defect in the wheel drive system including the motor-side coupler 25 and the wheel hub-side (or rotator-side) coupler 26 can be detected, and reliability can be improved and safety can be improved.

Also, in the embodiment, the seal member 33 which seals between the carrier 14a and the axial facing end surface of the wheel hub 24 in order to seal the lubrication oil in the lubrication oil sealed-in space for the motor-side coupler 25 and the wheel hub-side (or rotator-side) coupler 26 is integrally molded on the sensor rotor 31 and is provided on the corresponding end surface of the wheel hub 24. Thus, during assembly of the sensor rotor 31, assembly of the seal member 33 is also completed, and ease of assembly operation can be enhanced, and a parts count is reduced to thus contribute greatly to weight and cost reductions, which is greatly advantageous.

The invention claimed is:

1. A motor drive unit, in which an output end of a motor drive system using an electric motor as a power source and a rotator rotatably supported by a bearing unit are arranged side by side in an axial direction, and the output end of the motor drive system and the rotator are drivingly coupled in a relatively displaceable manner by a coupling member in which a plurality of couplers spaced apart in an axial direction are set, wherein:

the coupling member is an output shaft inserted in a center hole in the rotator, one of a pair of couplers is a motor-side coupler drivingly coupled in an axial displaceable and swinging displaceable manner to the output end of the motor drive system, the motor-side coupler set such that an opposite end of the coupling member protruding from the rotator is drivingly coupled to the output end of the motor drive system in an axially displaceable and swinging displaceable manner, another of the pair of couplers is a rotator-side coupler drivingly coupled in an axial displaceable and swinging displaceable manner to the rotator, the rotator-side coupler set such that an inserted end of the coupling member is drivingly coupled to the rotator in an axially displaceable and swinging displaceable manner, at an axial position of the rotator farther away from the output end of the motor drive system than the bearing unit, the bearing unit of the rotator is arranged such that a center of displacement of the rotator defined by the bearing unit is located between the motor-side coupler and the rotator-side coupler, and the pair of couplers is configured to accommodate a displacement of a plurality of displacements of the rotator, the plurality of displacements of the rotator comprising a parallel displacement, a swinging displacement, and an axial displacement, the output end of the motor drive system is sealed to an axially butting end of the rotator, whereby a seal member defining a lubricant sealed-in space for the rotator-side coupler and the motor-side coupler is provided on the axially butting end of the rotator.

2. The motor drive unit according to claim 1, wherein the bearing unit of the rotator is arranged such that the center of displacement of the rotator is located at an axial midpoint between the motor-side coupler and the rotator-side coupler.

3. The motor drive unit according to claim 1, wherein the motor drive system contains a transmission mechanism, and the output end of the motor drive system is an output rotation member of the transmission mechanism, and the motor-side coupler drivingly couples the output rotation member of the transmission mechanism and the coupling member in axially displaceable and swinging displaceable manner.

4. The motor drive unit according to claim 1, wherein the axially butting end of the rotator is provided with a sensor rotor of a rotation sensor configured to detect a rotation speed of the rotator.

5. The motor drive unit according to claim 4, wherein the seal member is provided integrally with the sensor rotor.

* * * * *